United States Patent
Bui et al.

(10) Patent No.: US 10,395,687 B1
(45) Date of Patent: *Aug. 27, 2019

(54) TAPE DRIVE BEARING TEMPERATURE CONTROL

(71) Applicant: International Business Machines Corporation, Armonk, NY (US)

(72) Inventors: Nhan X. Bui, Tucson, AZ (US); Kevin B. Judd, Vail, AZ (US); Randy C. Inch, Tuscon, AZ (US); Mark A. Lantz, Thalwil (CH); David H. F. Harper, Vail, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/905,865

(22) Filed: Feb. 27, 2018

(51) Int. Cl.
*G11B 15/60* (2006.01)
*G11B 5/008* (2006.01)

(52) U.S. Cl.
CPC .......... *G11B 15/60* (2013.01); *G11B 5/00813* (2013.01)

(58) Field of Classification Search
CPC ..... G11B 15/60; G11B 5/00813; G11B 33/14; G11B 15/665
See application file for complete search history.

(56) References Cited

U.S. PATENT DOCUMENTS

| | | | |
|---|---|---|---|
| 3,625,456 A * | 12/1971 | Hankins | G11B 15/26 226/195 |
| 5,014,141 A | 5/1991 | Gervais et al. | |
| 5,224,643 A | 7/1993 | Kojima et al. | |
| 5,327,315 A * | 7/1994 | Nouchi | G11B 15/6653 360/137 |
| 5,341,262 A * | 8/1994 | Yamasaki | G11B 15/61 360/128 |
| 5,923,496 A | 7/1999 | Perona | |
| 5,953,174 A | 9/1999 | Satou et al. | |

(Continued)

FOREIGN PATENT DOCUMENTS

| | | |
|---|---|---|
| EP | 1429339 A2 | 6/2004 |
| WO | 9711462 A1 | 3/1997 |

OTHER PUBLICATIONS

Bui et al., "Tape Drive Temperature Control for Media Dimensional Stability", U.S. Appl. No. 15/905,873, filed Feb. 27, 2018, 27 pages.

(Continued)

*Primary Examiner* — Brian E Miller
(74) *Attorney, Agent, or Firm* — Brian M. Restauro

(57) ABSTRACT

A determination is made whether read/write is enabled within the tape drive storage unit. In response to determining that read/write is enabled, a determination is made whether a temperature within the tape drive storage unit exceeds a threshold value. In response to determining that the temperature within the tape drive storage unit exceeds the threshold value, a determination is made of a direction of travel of a tape media within the tape drive storage unit. In response to determining that the direction of travel is a forward direction, a first cooling device is powered on. The first cooling device lowers the temperature of a first guide roller and the tape media coming off a first tape storage reel prior to the tape media passing by a read/write head within the tape drive storage unit.

15 Claims, 5 Drawing Sheets

(56) References Cited

U.S. PATENT DOCUMENTS

| | | | | |
|---|---|---|---|---|
| 6,005,735 | A * | 12/1999 | Gleim | G11B 15/026 340/584 |
| 6,172,834 | B1 * | 1/2001 | Newton | G11B 15/026 360/73.04 |
| 7,467,757 | B2 * | 12/2008 | Biskeborn | G11B 15/43 242/346.2 |
| 7,551,385 | B2 * | 6/2009 | Biskeborn | G11B 5/40 360/128 |
| 7,656,602 | B2 * | 2/2010 | Iben | G11B 5/3106 360/66 |
| 7,869,154 | B2 * | 1/2011 | Kudo | G11B 5/00821 360/128 |
| 8,537,491 | B2 | 9/2013 | Kotaki | |
| 2003/0116667 | A1 | 6/2003 | Tamura et al. | |
| 2009/0266511 | A1 | 10/2009 | Yang | |

OTHER PUBLICATIONS

Bui et al. "Tape Drive Temperature Control for Media Dimensional Stability", U.S. Appl. No. 16/286,660, filed Feb. 27, 2019, 28 pages.

* cited by examiner

TAPE DRIVE BEARING TEMPERATURE CONTROL

BACKGROUND

The present invention relates generally to the field of magnetic tape data storage, and more particularly to controlling the temperature of roller bearings within a tape drive to improve the track-following performance of the media within the tape drive.

Magnetic tape data storage (e.g., an automated tape library) is a system for storing digital information on a magnetic tape media using digital recording. Modern magnetic tape is most commonly packaged in cartridges and cassettes; however, open reels are also used to hold the tape media. The tape drive is the device that performs writing or reading of data on the magnetic tape. Autoloaders automate cartridge handling and provide increased speed for accessing data stored on the tape media.

SUMMARY OF THE INVENTION

Embodiments of the present invention include an apparatus for controlling the temperature of roller bearings within a tape drive storage unit to improve the track-following performance of the media within the tape drive. In one embodiment, the apparatus is comprised of the following: a first tape storage reel located on a left side of the apparatus; a second tape storage reel located on a right side of the apparatus; a tape attached to the first tape storage reel on an end of the tape and the tape also attached to the second tape storage reel on an opposing end of the tape, wherein the tape is magnetic; a tape transport mechanism, wherein the tape transport mechanism moves the tape along a tape path between the first tape storage reel and the second tape storage reel; a read/write head located in between the first tape storage reel and the second tape storage reel; a first cooling device attached to and in intimate contact with a portion of the tape transport mechanism; a second cooling device attached to and in intimate contact with another portion of the tape transport mechanism; and a controller.

Additional embodiments of the present invention include an approach for controlling the temperature of roller bearings within a tape drive storage unit to improve the track-following performance of the media within the tape drive. In one embodiment, a determination is made whether read/write is enabled within the tape drive storage unit. In response to determining that read/write is enabled, a determination is made whether a temperature within the tape drive storage unit exceeds a threshold value. In response to determining that the temperature within the tape drive storage unit exceeds the threshold value, a determination is made of a direction of travel of a tape media within the tape drive storage unit. In response to determining that the direction of travel is a forward direction, a first cooling device is powered on. The first cooling device lowers the temperature of a first guide roller and the tape media coming off a first tape storage reel prior to the tape media passing by a read/write head within the tape drive storage unit.

DETAILED DESCRIPTION

Figure 1:
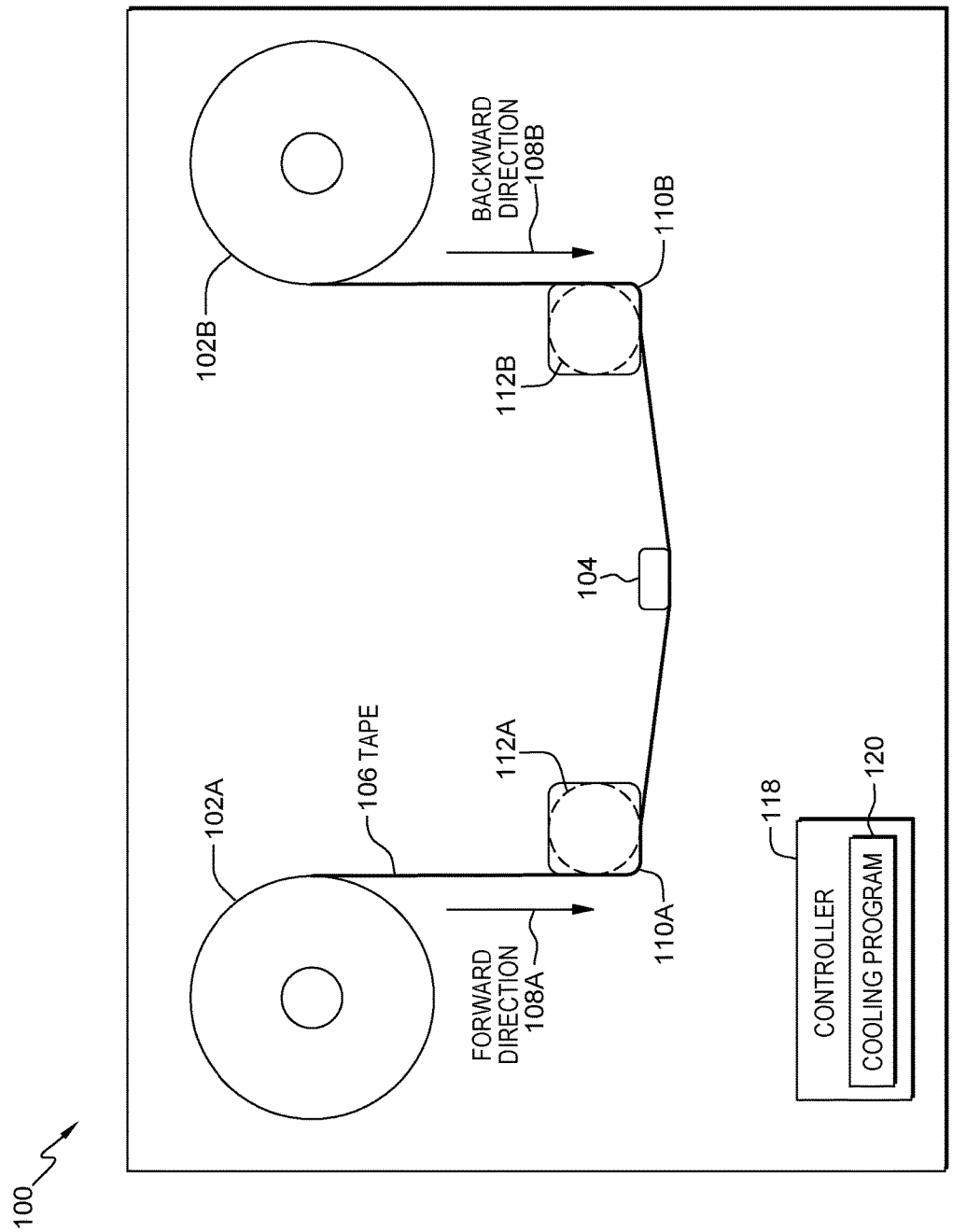
FIG. 1 depicts a schematic of an example tape storage unit with first and second guide rollers, in accordance with an embodiment of the present invention.

Embodiments of the present invention provide for controlling the temperature of roller bearings within a tape drive to improve the track-following performance of the media within the tape drive. Temperature fluctuations within the tape drive, along with tape path imperfections, can contribute to lateral tape motion (LTM) which negatively impacts the precise positioning of the read/write head over the data tracks on the tape media. Increased temperature within the tape drive can cause problems such as harmonic disturbance of the guide rollers, expansion of the roller barrels and roller bearing races, and less dampening of the bearing lubrication in the tape drive.

Embodiments of the present invention disclose an approach for controlling the temperature of roller bearings within a tape drive to improve the track-following performance of the media within the tape drive. In an embodiment, thermoelectric cooling devices (such as Peltier coolers) are placed inside the tape drive and are used to cool the tape media, guide rollers, and/or tape guides, which helps to control the expansion of the various components in an effort to maintain positional accuracy of the head relative to the data tracks of the media.

References in the specification to "one embodiment", "an embodiment", "an example embodiment", etc., indicate that the embodiment described may include a particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

For purposes of the description hereinafter, the terms "upper", "first", "second", "vertical", "horizontal", "top", "bottom", and derivatives thereof shall relate to the disclosed structures and methods, as oriented in the drawing Figures. The terms "overlaying", "atop", "positioned on", or "positioned atop" mean that a first element, such as a first structure, is present on a second element, such as a second structure, wherein intervening elements, such as an interface structure may be present between the first element and the second element. The term "direct contact" means that a first element, such as a first structure, and a second element, such as a second structure, are connected without any intermediary conducting, insulating or semiconductor layers at the interface of the two elements.

As referred to herein, certain components in this specification are substantially identical with the exception of a "first side" versus "second side" position and arrangement within the tape drive (e.g., in FIG. 1, first tape storage reel 102A and second tape storage reel 102B). In those situations where components are substantially identical, only one of the substantially identical components will be described in detail (e.g., only first tape storage reel 102A will be described in detail).

The present invention will now be described in detail with reference to the Figures.

FIG. 1 is a schematic of an example tape storage unit with first and second guide rollers, generally designated 100, in accordance with one embodiment of the present invention. FIG. 1 provides only an illustration of one implementation and does not imply any limitations with regard to the different embodiments that may be implemented. Many modifications to the depicted embodiment may be made by those skilled in the art without departing from the scope of the invention as recited by the claims.

In an embodiment, tape storage unit 100 includes first tape storage reel 102A, second tape storage reel 102B, read/write head 104, tape 106, first cooler 110A, second cooler 110B, first guide roller 112A, second guide roller 112B, controller 118, and cooling program 120.

In an embodiment, first tape storage reel 102A is an open reel made of a plastic, a similar material, or any material suitable for the application, used to either collect or dispense the tape media as the tape media travels across read/write head 104 within tape storage unit 100. In an embodiment, first tape storage reel 102A is ninety-seven plus or minus one millimeter in diameter. In another embodiment, first tape storage reel 102A can be any diameter. According to embodiments of the present invention, first tape storage reel 102A may be contained within a cartridge or a cassette instead of being an open reel. In an embodiment, second tape storage reel 102B is substantially similar to first tape storage reel 102A.

In an embodiment, read/write head 104 is a type of transducer in tape storage unit 100 used to convert electrical signals to magnetic fluctuations and vice versa for writing and reading, respectively, data to and/or from tape 106. In an embodiment, read/write head 104 includes a toroidal core with a small air gap. In the embodiment, a coil of wire is wound around the toroidal core which is made of a magnetically permeable metal. Passing an electrical signal through the coil of wire results in a changing magnetic field which flows through tape 106 when passing adjacent to read/write head 104. In this manner, read/write head 104 changes the electrical polarity of the bits on tape 106 resulting in data records being written (i.e., stored) to tape 106 as a series of zeroes and ones for digital data. Reversing the process induces an electrical current across the small air gap allowing read/write head 104 to read (i.e., retrieve) data from tape 106. In other embodiments, data may be read using a shielded magnetoresistive sensor such as an anisotropic magnetoresistive (AMR) sensor, a giant magnetoresistive (GMR) sensor, and a tunneling magnetoresistive (TMR) sensor.

In an embodiment, tape 106 is the media within tape storage unit 100 that data is written to or read from via read/write head 104. In an embodiment, tape 106 includes a plastic film base material (e.g., polyethylene naphthalate) with a thin, magnetizable coating on the surface (e.g., metal particulate, barium ferrite). In the embodiment, tape 106 includes four data bands, varying numbers of wraps per band, and varying numbers of tracks (read/write elements) per wrap. The number of wraps/band and tracks/wrap determine the total number of tracks on tape 106 available for data storage.

In an embodiment, forward direction 108A is a direction of travel for tape 106 when tape 106 is coming off of first tape storage reel 102A and being wound onto second tape storage reel 102B.

In an embodiment, backward direction 108B is the opposite direction of travel of tape 106 from forward direction 108A.

In an embodiment, first cooler 110A is a thermoelectric cooling device (e.g., a Peltier cooler) used to lower the temperature of first guide roller 112A and tape 106 within tape storage unit 100. In an embodiment, first cooler 110A is attached to and in intimate contact with one side of first guide roller 112A. According to embodiments of the present invention, first cooler 110A uses the Peltier effect to create a heat flux between the junction of two different types of materials. First cooler 110A is a solid-state active heat pump which transfers heat from one side of a device to the other, with consumption of electrical energy, depending on the direction of the current. The advantages of Peltier cooling are a lack of moving parts or circulating liquid, very long life, invulnerability to leaks, small size, and flexible shape. The disadvantages of Peltier cooling are high cost and poor power efficiency. In an embodiment, second cooler 110B is substantially similar to first cooler 110A with the exception that second cooler 110B is attached to and in intimate contact with one side of second guide roller 112B.

Figure 5:
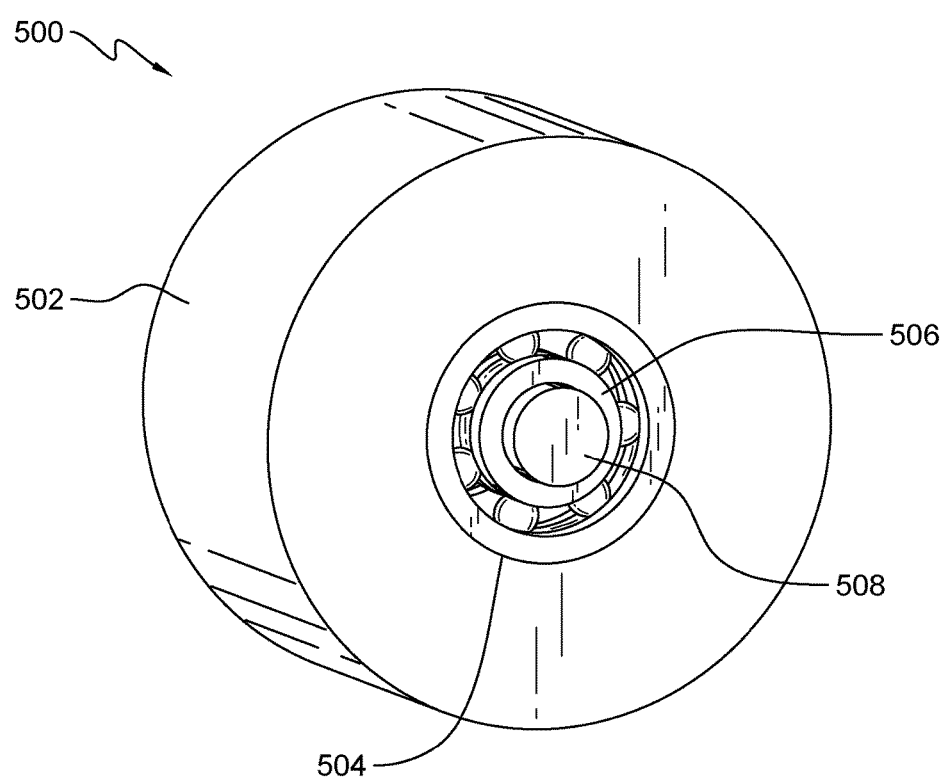
FIG. 5 depicts a schematic of an example sub-assembly, in accordance with an embodiment of the present invention.

In an embodiment, first guide roller 112A is a sub-assembly component of the tape transport mechanism within tape storage unit 100 that guides tape 106 as tape 106 moves between first tape storage reel 102A and read/write head 104. According to an embodiment of the present invention, first guide roller 112A is shown in FIG. 5 by sub-assembly 500 which consists of main cylinder 502 constrained to stationary shaft 508 by two roller bearing sub-assemblies (i.e., outer roller bearing sub-assembly 504 and inner roller bearing sub-assembly 506) which allow free rotation of main cylinder 502 around stationary shaft 508. In an embodiment, first guide roller 112A changes the direction of travel of tape 106 by ninety degrees plus or minus two degrees. According to an embodiment of the present invention, first guide roller 112A is made from stainless steel. According to another embodiment, first guide roller 112A is made from a non-stainless steel with a coating. According to yet another embodiment, first guide roller 112A is made from any type of material used to construct guide rollers in a transport mechanism within a tape drive storage unit. In an embodiment, second guide roller 112B is substantially similar to first guide roller 112A with the exception that second guide roller 112B guides tape 106 as tape 106 moves between second tape storage reel 102B and read/write head 104.

In an embodiment, controller 118 is a logic card that provides control function to tape storage unit 100. In an embodiment, controller 118 includes cooling program 120. According to embodiments of the present invention, functions managed by controller 118 include centralized management of tape storage unit 100 and sending read/write instructions to read/write head 104 for retrieving data from and storing data to tape 106.

In an embodiment, cooling program 120 is a program, a subprogram of a larger program, an application, a plurality of applications, or mobile application software, which functions to control the temperature of tape 106, first guide roller 112A (or second guide roller 112B) to improve the track-following performance of tape 106 within tape storage unit 100. A program is a sequence of instructions written by a programmer to perform a specific task. According to embodiments of the present invention, responsive to a temperature exceeding a threshold, cooling program 120 will power on first cooler 110A or second cooler 110B, depending on the direction of travel of tape 106. Cooling program 120 may run by itself but may be dependent on system software (not shown in FIG. 1) to execute. In one embodiment, cooling program 120 functions as a stand-alone program residing on controller 118. In another embodiment, cooling program 120 may work in conjunction with other programs, applications, etc., found in tape storage unit 100. In yet another embodiment, cooling program 120 may be found on other computing devices (not shown in FIG. 1) in tape storage unit 100.

Figure 2:
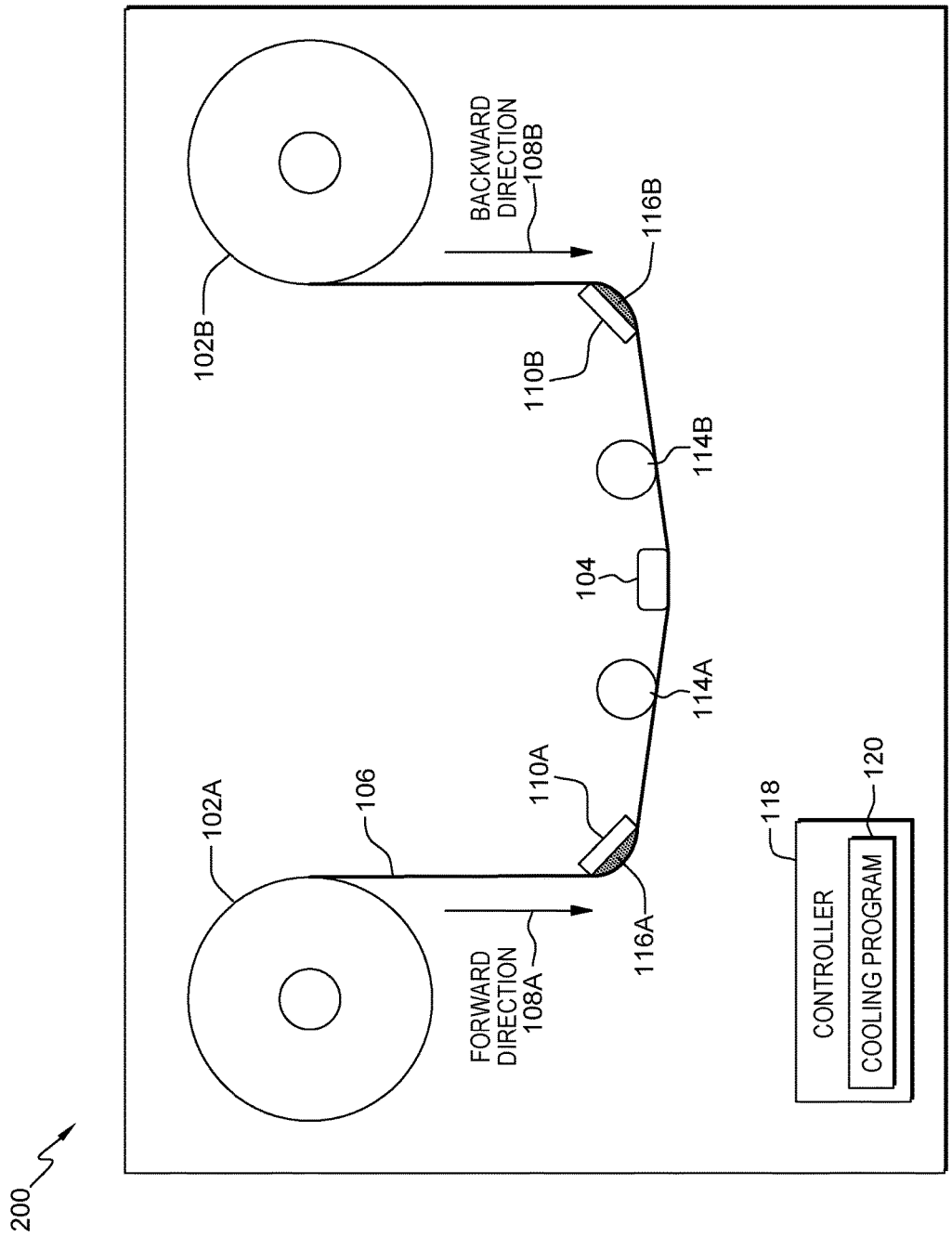
FIG. 2 depicts a schematic of an example tape storage unit with first and second guide rollers replaced by first and second tape guides, in accordance with an embodiment of the present invention.

FIG. 2 is a schematic of an example tape storage unit with first and second guide rollers replaced by first and second tape guides, generally designated 200, in accordance with one embodiment of the present invention. FIG. 2 provides only an illustration of one implementation and does not imply any limitations with regard to the different embodiments that may be implemented. Many modifications to the depicted embodiment may be made by those skilled in the art without departing from the scope of the invention as recited by the claims.

In an embodiment, tape storage unit 200 includes the following previously discussed features: first tape storage reel 102A, second tape storage reel 102B, read/write head 104, tape 106, first cooler 110A, second cooler 110B, controller 118, and cooling program 120. In the embodiment, tape storage unit 200 includes new features first roller 114A, second roller 114B, first tape guide 116A, and second tape guide 116B which replace first guide roller 112A and second guide roller 112B. The new features will be discussed in detail in the following paragraphs.

In an embodiment, first roller 114A is a sub-assembly component of the tape transport mechanism within tape storage unit 200 that moves tape 106 as tape 106 travels between first tape storage reel 102A and read/write head 104. In an embodiment, first roller 114A is shown in FIG. 5 by sub-assembly 500 which consists of main cylinder 502 constrained to stationary shaft 508 by two roller bearing sub-assemblies (i.e., outer roller bearing sub-assembly 504 and inner roller bearing sub-assembly 506) which allow free rotation of main cylinder 502 around stationary shaft 508. According to an embodiment of the present invention, first roller 114A is made from stainless steel. According to another embodiment, first roller 114A is made from non-stainless steel with a coating. According to yet another embodiment, first roller 114A is made from any type of material used to construct rollers in a transport mechanism within a tape drive storage unit. In an embodiment, first roller 114A is positioned between first tape guide 116A and read/write head 104. In an embodiment, second roller 114B is substantially similar to first roller 114A with the exception that second roller 114B is positioned between second tape guide 116B and read/write head 104.

In an embodiment, first tape guide 116A is a component of the tape transport mechanism within tape storage unit 200 that moves tape 106 as tape 106 travels between first tape storage reel 102A and read/write head 104. In an embodiment, first tape guide 116A includes a curved side, which contacts tape 106 as tape 106 moves within tape storage unit 200, and a flat side opposite the curved side. According to an embodiment of the present invention, first tape guide 116A is made from stainless steel for high thermal conductivity. In an embodiment, first tape guide 116A changes the direction of travel of tape 106 ninety plus or minus two degrees. According to an embodiment of the present invention, first tape guide 116A is positioned between first tape storage reel 102A and first roller 114A. In an embodiment, second tape guide 116B is substantially similar to first tape guide 116A with the exception that second tape guide 116B is positioned between second tape storage reel 102B and second roller 114B.

According to embodiments of the present invention, first cooler 110A is attached to and in intimate contact with the flat side of first tape guide 116A and second cooler 110B is attached to and in intimate contact with the flat side of second tape guide 116B.

Figure 3:
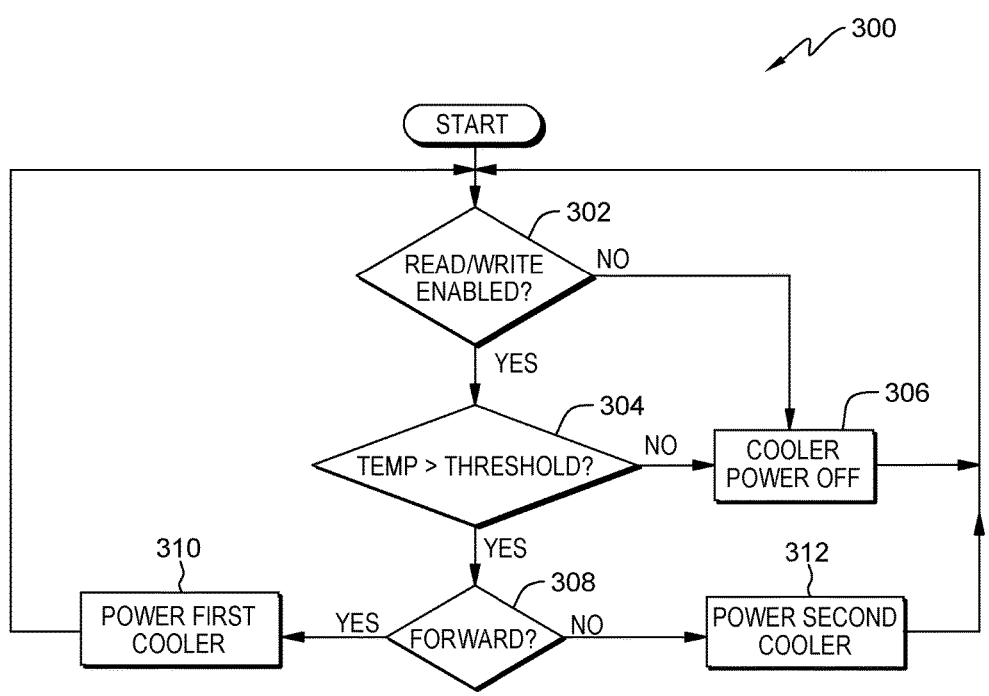
FIG. 3 depicts a flowchart of a program for controlling the temperature of roller bearings within a tape drive to improve the track-following performance of the media within the tape drive, in accordance with an embodiment of the present invention.

FIG. 3 is a flowchart of workflow 300 depicting an approach for controlling the temperature of roller bearings within a tape drive to improve the track-following performance of the media within the tape drive. In one embodiment, the method of workflow 300 is performed by cooling program 120. In an alternative embodiment, the method of workflow 300 may be performed by any other program working with cooling program 120. In an embodiment, a user may invoke workflow 300 upon powering on tape storage unit 100 or tape storage unit 200. In an alternative embodiment, a user may invoke workflow 300 upon accessing cooling program 120.

In an embodiment, cooling program 120 determines whether read/write is enabled (decision step 302). In other words, cooling program 120 determines whether a tape drive storage unit is writing data to a tape media or reading data from a tape media. In an embodiment (decision step 302, YES branch), cooling program 120 determines that read/write is enabled on the tape drive storage unit; therefore, cooling program 120 proceeds to decision step 304 to determine whether the temperature within the tape drive storage unit exceeds a threshold value. In the embodiment (decision step 302, NO branch), cooling program 120 determines that read/write is not enabled on the tape drive storage unit; therefore, cooling program 120 proceeds to step 308 to power off any coolers that are running.

In an embodiment, cooling program 120 determines whether a temperature exceeds a threshold (decision step 304). In other words, responsive to determining that read/write is enabled in the tape drive storage unit, cooling program 120 determines whether the temperature within the tape drive storage unit exceeds a threshold value. According to embodiments of the present invention, a temperature sensor (not shown in FIG. 1) within controller 118 monitors the temperature within the tape drive storage unit. In an embodiment, the temperature threshold value is a value of the temperature within the tape drive storage unit above which problems, such as thermal expansion of components, effectiveness of lubrication, and increased harmonic disturbance of the guide rollers, may occur and affect track-following performance. In an embodiment (decision step 304, NO branch), cooling program 120 determines that the temperature within the tape drive storage unit does not exceed a threshold value; therefore, cooling program 120 proceeds to step 306 to turn off cooler power. In the embodiment (decision step 304, YES branch), cooling program 120 determines that the temperature within the tape drive storage unit exceeds a threshold value; therefore, cooling program 120 proceeds to decision step 308 to determine whether the tape media in the tape drive storage unit is traveling in the forward direction.

In an embodiment, cooling program 120 turns cooler power off (step 306). In other words, responsive to (i) determining that read/write is not enabled in the tape drive storage unit or (ii) that a temperature within the tape storage unit does not exceed a threshold value, cooling program 120 powers off any cooler that is powered on as cooling is not required within the tape drive storage unit.

In an embodiment, cooling program 120 determines whether the direction of movement is forward (decision step 308). In other words, responsive to determining that read/write is enabled in the tape drive storage unit and the temperature within the tape drive storage unit exceeds a threshold value, cooling program 120 determines whether the tape media is traveling in the forward direction. In an embodiment (decision step 308, YES branch), cooling program 120 determines that the tape media is traveling in the forward direction; therefore, cooling program 120 proceeds to step 310 to power on the first cooler. In the embodiment (decision step 308, NO branch), cooling program 120 determines that the tape media is not traveling in the forward direction; therefore, cooling program 120 proceeds to step 312 to power on the second cooler.

In an embodiment, cooling program 120 turns on power to the first cooler (step 310). In other words, responsive to determining that read/write is enabled in the tape drive storage unit, the temperature within the tape drive storage unit exceeds a threshold value, and the tape media is traveling in the forward direction, cooling program 120 powers on the first cooler. In a first example, referring to FIG. 1, tape 106 is traveling in forward direction 108A (i.e., tape 106 is coming off of first tape storage reel 102A, passing under read/write head 104, and is being wound onto second tape storage reel 102B). In the first example, first cooler 110A is powered on by cooling program 120 in order to cool first guide roller 112A, the associated guide roller bearings, and tape 106. In a second example, referring to FIG. 2, tape 106 is traveling in forward direction 108A (i.e., tape 106 is coming off of first tape storage reel 102A, passing under read/write head 104, and is being wound onto second tape storage reel 102B). In the second example, first cooler 110A is powered on by cooling program 120 in order to cool first tape guide 116A. first roller 114A, the associated roller bearings, and tape 106.

In an embodiment, cooling program 120 turns on power to the second cooler (step 312). In other words, responsive to determining that read/write is enabled in the tape drive storage unit, the temperature within the tape drive storage unit exceeds a threshold value, and the tape media is not traveling in the forward direction, cooling program 120 powers on the second cooler. In a third example, referring to FIG. 1, tape 106 is traveling in backward direction 108B (i.e., tape 106 is coming off of second tape storage reel 102B, passing under read/write head 104, and is being wound onto first tape storage reel 102A). In the third example, second cooler 110B is powered on by cooling program 120 in order to cool second guide roller 112B, the associated guide roller bearings, and tape 106. In a fourth example, referring to FIG. 2, tape 106 is traveling in backward direction 108B (i.e., tape 106 is coming off of second tape storage reel 102B, passing under read/write head 104, and is being wound onto first tape storage reel 102A). In the fourth example, first cooler 110A is powered on by cooling program 120 in order to cool second tape guide 116B, second roller 114B, the associated roller bearings, and tape 106.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Having described embodiments of an approach for controlling the temperature of a tape drive to improve the track-following performance of the media within the tape drive (which are intended to be illustrative and not limiting), it is noted that modifications and variations may be made by persons skilled in the art in light of the above teachings. It is therefore to be understood that changes may be made in the particular embodiments disclosed which are within the scope of the invention as outlined by the appended claims.

Figure 4:
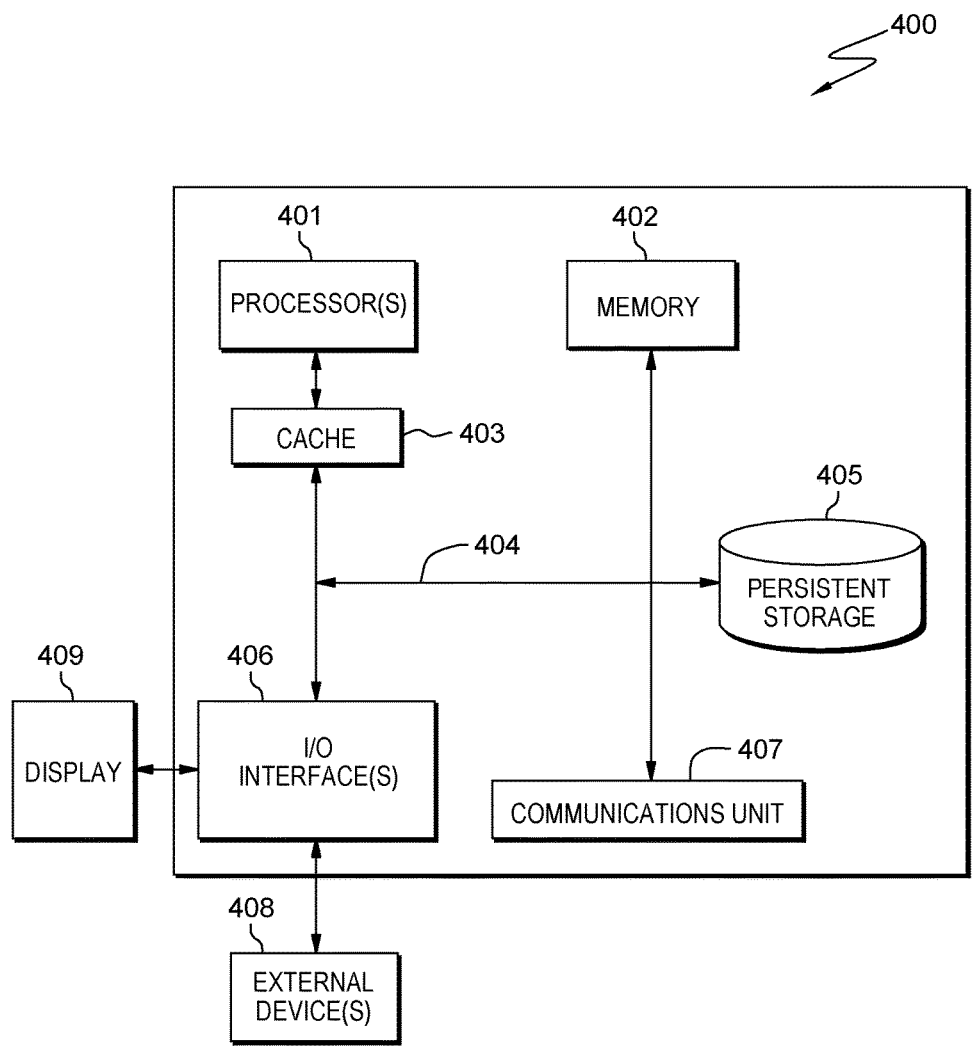
FIG. 4 depicts a block diagram of components of a computing environment, in accordance with an embodiment of the present invention.

FIG. 4 depicts computer system 400, which is an example of a system that includes cooling program 120. Computer system 400 includes processor(s) 401, cache 403, memory 402, persistent storage 405, communications unit 407, input/output (I/O) interface(s) 406 and communications fabric 404. Communications fabric 404 provides communications between cache 403, memory 402, persistent storage 405, communications unit 407, and input/output (I/O) interface(s) 406. Communications fabric 404 can be implemented with any architecture designed for passing data and/or control information between processors (such as microprocessors, communications and network processors, etc.), system memory, peripheral devices, and any other hardware components within a system. For example, communications fabric 404 can be implemented with one or more buses or a crossbar switch.

Memory 402 and persistent storage 405 are computer readable storage media. In this embodiment, memory 402 includes random access memory (RAM). In general, memory 402 can include any suitable volatile or non-volatile computer readable storage media. Cache 403 is a fast memory that enhances the performance of processors 401 by holding recently accessed data, and data near recently accessed data, from memory 402.

Program instructions and data used to practice embodiments of the present invention may be stored in persistent storage 405 and in memory 402 for execution by one or more of the respective processors 401 via cache 403. In an embodiment, persistent storage 405 includes a magnetic hard disk drive. Alternatively, or in addition to a magnetic hard disk drive, persistent storage 405 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 405 may also be removable. For example, a removable hard drive may be used for persistent storage 405. Other examples include optical and magnetic disks, thumb drives, and smart cards that are inserted into a drive for transfer onto another computer readable storage medium that is also part of persistent storage 405.

Communications unit 407, in these examples, provides for communications with other data processing systems or devices. In these examples, communications unit 407 includes one or more network interface cards. Communications unit 407 may provide communications through the use of either or both physical and wireless communications links. Program instructions and data used to practice embodiments of the present invention may be downloaded to persistent storage 405 through communications unit 407.

I/O interface(s) 406 allows for input and output of data with other devices that may be connected to each computer system. For example, I/O interface 406 may provide a connection to external devices 408 such as a keyboard, keypad, a touchscreen, and/or some other suitable input device. External devices 408 can also include portable computer readable storage media such as, for example, thumb drives, portable optical or magnetic disks, and memory cards. Software and data used to practice embodiments of the present invention can be stored on such portable computer readable storage media and can be loaded onto persistent storage 405 via I/O interface(s) 406. I/O interface(s) 406 also connect to display 409.

Display 409 provides a mechanism to display data to a user and may be, for example, a computer monitor.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

What is claimed is:

1. An apparatus, the apparatus comprising:
   a first tape storage reel located on a left side of the apparatus;
   a second tape storage reel located on a right side of the apparatus;
   a tape attached to the first tape storage reel on an end of the tape and the tape also attached to the second tape storage reel on an opposing end of the tape, wherein the tape is magnetic;
   a tape transport mechanism, wherein the tape transport mechanism moves the tape along a tape path between the first tape storage reel and the second tape storage reel;
   a read/write head located in between the first tape storage reel and the second tape storage reel;
   a first cooling device attached to and in intimate contact with a portion of the tape transport mechanism;
   a second cooling device attached to and in intimate contact with another portion of the tape transport mechanism; and
   a controller, wherein
      the controller comprises one or more processors that provide control function to the apparatus, and
      the control function includes sending read/write instructions to the read/write head, located between the first tape storage reel and the second tape storage reel, and powering off and on the first cooling device and the second cooling device.

2. The apparatus of claim 1, wherein the tape transport mechanism includes a first guide roller and a second guide roller.

3. The apparatus of claim 2, wherein:
   the first guide roller and the second guide roller each include a main cylinder constrained to a stationary shaft by two roller bearing sub-assemblies which allow free rotation of the main cylinder around the stationary shaft;
   the first guide roller is positioned in the tape path between the first tape storage reel and the read/write head; and
   the second guide roller is positioned in the tape path between the second tape storage reel and the read/write head.

4. The apparatus of claim 2, wherein:
   the first cooling device is attached to and in intimate contact with a side of a main cylinder of the first guide roller; and
   the second cooling device is attached to and in intimate contact with a side of a main cylinder of the second guide roller.

5. The apparatus of claim 1, wherein the first cooling device and the second cooling device are Peltier thermoelectric devices.

6. A method, the method comprising:
   determining, by one or more computer processors, whether read/write is enabled within a tape drive storage unit;
   responsive to determining that read/write is enabled within the tape drive storage unit, determining, by the one or more computer processors, whether a temperature within the tape drive storage unit exceeds a threshold value;
   responsive to determining that the temperature within the tape drive storage unit exceeds the threshold value, determining, by the one or more computer processors, a direction of travel of a tape media within the tape drive storage unit; and
   responsive to determining that the direction of travel of the tape media within the tape drive storage unit is a forward direction, powering on, by the one or more computer processors, a first cooling device within the tape drive storage unit, wherein the first cooling device lowers the temperature of a first guide roller and the tape media coming off a first tape storage reel prior to the tape media passing by a read/write head within the tape drive storage unit.

7. The method of claim 6, further comprising:
   responsive to determining that the direction of travel of the tape media within the tape drive storage unit is a backward direction, powering on, by the one or more computer processors, a second cooling device within the tape drive storage unit, wherein the second cooling device lowers the temperature of a second guide roller and the tape media coming off a second tape storage reel prior to the tape media passing by a read/write head within the tape drive storage unit.

8. The method of claim 6, wherein the threshold value of the temperature within the tape drive storage unit is the temperature within the tape drive storage unit above which problems affecting track-following performance of the tape media within the tape drive storage unit occur.

9. The method of claim 8, wherein problems affecting track-following performance are selected from the group consisting of thermal expansion of components, effectiveness of lubrication, and increased harmonic disturbance of guide rollers.

10. The method of claim 6, further comprising:
    responsive to determining that (i) the read/write is not enabled within the tape drive storage unit or (ii) the read/write is enabled within the tape drive storage unit and the temperature within the tape drive storage unit does not exceed a threshold value, powering off, by the one or more computer processors, the first cooling device when the first cooling device is powered on and powering off, by the one or more computer processors, a second cooling device when the second cooling device is powered on.

11. A computer program product, the computer program product comprising:
    one or more computer readable storage media; and
    program instructions stored on the one or more computer readable storage media, the program instructions comprising:
       program instructions to determine whether read/write is enabled within a tape drive storage unit;
       responsive to determining that read/write is enabled within the tape drive storage unit, program instructions to determine whether a temperature within the tape drive storage unit exceeds a threshold value;

responsive to determining that the temperature within the tape drive storage unit exceeds the threshold value, program instructions to determine a direction of travel of a tape media within the tape drive storage unit; and responsive to determining that the direction of travel of the tape media within the tape drive storage unit is a forward direction, program instructions to power on a first cooling device within the tape drive storage unit, wherein the first cooling device lowers the temperature of a first guide roller and the tape media coming off a first tape storage reel prior to the tape media passing by a read/write head within the tape drive storage unit.

12. The computer program product of claim 11, further comprising program instructions stored on the one or more computer readable storage media, to:

responsive to determining that the direction of travel of the tape media within the tape drive storage unit is a backward direction, power on a second cooling device within the tape drive storage unit, wherein the second cooling device lowers the temperature of a second guide roller and the tape media coming off a second tape storage reel prior to the tape media passing by a read/write head within the tape drive storage unit.

13. The computer program product of claim 11, wherein the threshold value of the temperature within the tape drive storage unit is the temperature within the tape drive storage unit above which problems affecting track-following performance of the tape media within the tape drive storage unit occur.

14. The computer program product of claim 13, wherein problems affecting track-following performance are selected from the group consisting of thermal expansion of components, effectiveness of lubrication, and increased harmonic disturbance of guide rollers.

15. The computer program product of claim 11, further comprising program instructions stored on the one or more computer readable storage media, to:

responsive to determining that (i) read/write is not enabled within the tape drive storage unit or (ii) read/write is enabled within the tape drive storage unit and the temperature within the tape drive storage unit does not exceed a threshold value, power off the first cooling device when the first cooling device is powered on and power off a second cooling device when the second cooling device is powered on.

* * * * *